Oct. 7, 1924.
E. MERRITT
1,510,792
METHOD OF AND MEANS FOR DETERMINING PHASE DIFFERENCE
Filed July 1, 1921
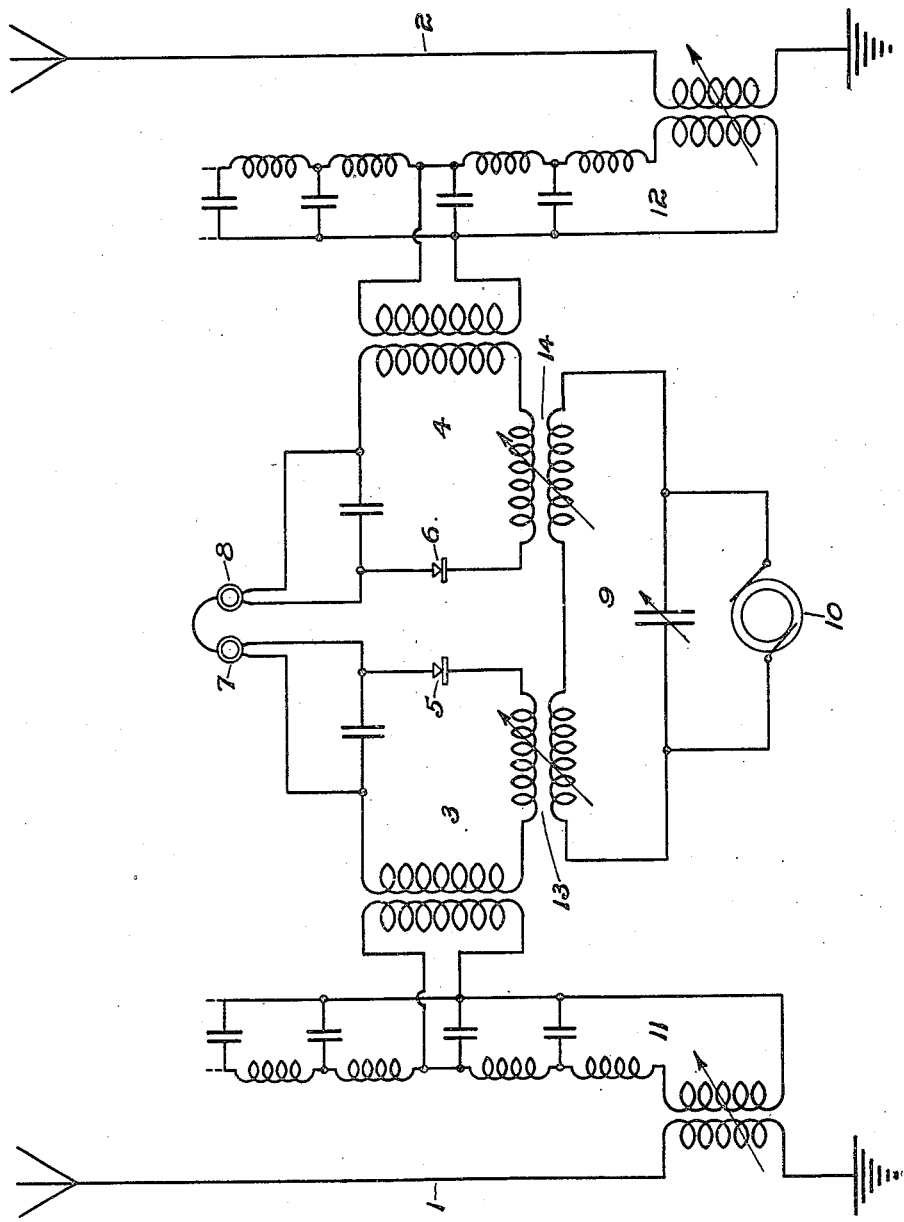
Inventor
Ernest Merritt
By
Attorney Patented Oct. 7, 1924.

1,510,792

UNITED STATES PATENT OFFICE.

ERNEST MERRITT, OF ITHACA, NEW YORK.

METHOD OF AND MEANS FOR DETERMINING PHASE DIFFERENCE.

Application filed July 1, 1921. Serial No. 481,935.

*To all whom it may concern:*

Be it known that I, ERNEST MERRITT, a citizen of the United States, residing at Ithaca, in the county of Tompkins and State of New York, have invented certain new and useful Improvements in Methods of and Means for Determining Phase Difference, of which the following is a specification.

My invention relates to methods of and means for determining phase difference and a particular object thereof is to determine the phase difference at relatively high frequencies.

One of the important applications of the invention is to determine the direction of waves by means of phase difference but the principle involved in the invention contemplates numerous other applications. and it therefore is my intention to claim my invention broadly as a system of phase determination, without any limitation as to the particular application of the system.

The fundamental principle involved is the determination of phase differences between trains of waves or vibrations, by means of the phase difference between the beats that are produced when these wave trains or vibrations are combined, by the process of heterodyning, with another wave train or vibrations of a different frequency.

It will be understood, of course, that it is immaterial whether the waves are electrical, mechanical or acoustical.

To illustrate the underlying principle of the method by which the phase difference between beats may be utilized to determine the phase difference between two vibrations, consider the special case of two alternating currents, $I_1$ and $I_2$, of the same frequency $n$ but, in general, of different amplitude and phase. We may put $$I_1 = a \cos 2\pi nt \quad I_2 = b \cos (2\pi nt + \varphi)$$

The phase difference, $\varphi$, between the two currents is to be determined.

If each of the two currents is heterodyned with a third current, $I_3$, of frequency $m$ the result will be the production of two currents $I_1'$ and $I_2'$, $I_1'$ being proportional to $I_1 + I_3$ and $I_2'$ proportional to $I_2 + I_3$. Heterodyning might be effected by coupling both $I_1$ and $I_3$ to some fourth circuit, in which case $I_1'$ is the current in this circuit, while $I_2'$ is the current in a circuit to which $I_2$ and $I_3$ are coupled. We have therefore (1) $I_1' = I_1 + I_3 = a \cos 2\pi nt + c \cos (2\pi mt + \theta)$.

(2) $I_2' = I_2 + I_3 = b \cos 2\pi (nt + \varphi) + c \cos (2\pi mt + \theta)$.

The form of the expressions for $I_1'$ and $I_2'$ may be changed as follows:

$$I_1' = a \cos 2\pi nt + c \cos (2\pi mt + \theta)$$
$$= a [\cos 2\pi nt + \cos (2\pi mt + \theta)] + (c - a) \cos (2\pi mt + \theta)$$

(3) $\quad = 2a \cos \left(2\pi \dfrac{n-m}{2} t - \dfrac{\theta}{2}\right) \cos \left(2\pi \dfrac{n+m}{2} + \dfrac{\theta}{2}\right) + (c - a) \cos (2\pi mt + \theta)$ (4) $\quad I_2' = 2b \cos \left(2\pi \dfrac{n-m}{2} t + \dfrac{\phi}{2} - \dfrac{\theta}{2}\right) \cos \left(2\pi \dfrac{n+m}{2} + \dfrac{\phi}{2} + \dfrac{\theta}{2}\right) + (c - b) \cos (2\pi mt + \theta)$.

If $m$ is not very different from $n$ then the frequency $$\dfrac{n-m}{2}$$

of the first factor in the expression for $I_1'$ in (3) is small while the frequency $$\dfrac{n+m}{2}$$

of the second factor is relatively large.

The first term in this expression therefore represents a current of frequency $$\dfrac{n+m}{2}$$

whose amplitude is changing with the frequency $$\dfrac{n-m}{2}.$$

With a suitable detector this changing amplitude would give rise to beats, or, if sufficiently rapid, to a beat tone. The second term of (3) represents a current of constant amplitude and frequency $m$ would be readily distinguished from the beating current of frequency $$\frac{n+m}{2}.$$

In radio work it would usually be above the audible range.

Equation (4) shows that $I_2'$ also consists of a current of frequency $m$ and constant amplitude, and a current of frequency $$\frac{n+m}{2}$$

whose amplitude changes with the frequency $$\frac{n-m}{2}.$$

With a suitable detector beats would be observed in this case also and the frequency of the beats—or of the beat tone—would be the same as in the case of $I_1'$. But it will be noted that the beats are in different phase in the two cases, and the phase difference between the two trains of beats, or between the beat tones if the beats are rapid enough to give a tone, is $\varphi/2$. This is shown by the fact that the maximum amplitude for the beating current in the case of $I_1'$ occurs when $$2\pi\frac{n-m}{2}-\frac{\theta}{2}=0.$$

While in the case of $I_2'$ the maximum occurs when $$2\pi\frac{n-m}{2}-\frac{\theta}{2}+\frac{\phi}{2}=0.$$

The difference in phase between the beats or beat tones is therefore half as great as that between the original currents $I_1$ and $I_2$. By determining the phase difference between the beats we are thus able to determine the phase difference between the original currents. And if we adjust the phase of one of the currents until the beats are in phase we know that the two currents themselves are in phase.

Although in the foregoing illustration the two vibrations whose difference in phase is to be determined are assumed to be alternating electric currents, yet it is clear that the same principle would apply in dealing with acoustic vibrations or trains of waves, or with vibrations of a pure-mechanical type. It is clear also that the principle is the same whatever may be the frequency of the original vibrations or of the vibration used in the process of heterodyning.

The best method of determining the phase difference between the beats will depend upon the rapidity with which the beats occur and upon the nature of the vibrations employed in each particular case. For example, if the beats occur so slowly that they can be separately observed any method may be used that is suitable for the measurement of rather short intervals of time. If the beats are so rapid as to produce an audible tone an acoustic compensator may be used i. e. the two tones may be brought to the ear, or other receiving device, by tubes of variable length and the length of one or both may be altered until the two sounds reach the ear in the same or in opposite phase. The first case is recognized by a maximum, the second by a minimum, of loudness. In certain cases I have found it advantageous to use the binaural principle as a means of estimating equality or inequality of phase; i. e. one beat tone is brought to the right ear and the other to the left; if the phase is the same for both the sound will appear to be directly in front of the observer.

If two sufficiently spaced collectors, such as antennæ, quartz crystals, or diaphragms, are acted upon by a train of waves coming in any direction, other than at right angles to the line joining the two collectors, the received currents will differ in phase by an amount depending upon the direction, the distance apart of the collectors, and the wave length. It is an important application of the present invention to determine this phase difference and by means of it the direction of the train of waves.

Heretofore it has been difficult to determine the phase difference of currents of high frequency, but by the present method the high frequency currents are heterodyned to produce beats and then the phase difference is determined by utilizing the phase shift in the beat tone. In a way the method may be thought of as time amplification. The time interval corresponding to the phase difference to be measured is quite small for radio frequencies, while the time interval corresponding to the phase difference between two beat tones is relatively large. Since the phase difference between the beat tones is always one-half of the phase difference between the original vibrations, and since the frequency of the beats can be made as small as desired, it will be seen that theoretically there is no limit to the time amplification the method permits, except of course, such as is due to the impossibility of maintaining constant frequencies, and other like difficulties.

I will now describe in detail one method by which my invention may be employed in recognizing and determining the phase difference between the received currents on two wave collectors, the ultimate purpose being to determine the direction from which the signals come, or to distinguish between signals from different directions.

The Figure is a diagrammatic view of the system:

Numerals 1 and 2 refer to two antennæ which are preferably exactly alike, and at a distance apart which is an appreciable fraction of a half wave length of the waves employed. It will be understood that in place of the antennæ shown, any form of collectors may be employed, such as quartz crystals or diaphragms, or any other sources of oscillations the phase difference of which is to be measured.

The antenna systems 1 and 2 are coupled respectively with two independent electric compensators 11 and 12. The compensators 11 and 12 are in turn coupled to two independent untuned circuits 3 and 4 each of said circuits containing a rectifying device, indicated by numerals 5 and 6. These may be vacuum tube, crystal, or other suitable rectifiers.

For the purpose of heterodyning. a local tuned oscillatory circuit 9, having a source of undamped oscillations 10, is coupled to both of the circuits 3 and 4, by means of the variable couplings 13 and 14. A vacuum tube oscillator serves well as the source of oscillations 10.

Each of the circuits 3 and 4 is provided with a telephone receiver, indicated by numeral 7 and 8.

In operation, the incoming wave trains are collected by the two antennæ and are heterodyned by the local oscillatory circuit 9, thereby producing beat tones in the circuits 3 and 4. If the two telephone receivers are now brought to the ears, the phase difference will show itself by the binaural sense, and signals from different stations may be distinguished by the fact that the sounds appear to come from different directions. If proper compensating means is provided in the system, the two currents may be brought into phase, the phase difference thus being measured.

To bring about this phase compensation the electric compensators 11 and 12 may be used as shown as a means of connecting the antennæ 1 and 2 to the circuits 3 and 4. Such electric compensators (see Pierce, Electric Oscillations and Electric Waves, Chapter XVL) produce a change in phase between the input current and the output current which, throughout the working range of the compensator, is proportional to the number of sections used. By providing suitable switches for introducing a larger or smaller number of sections in one or both of the compensators the difference in phase of the currents in circuits 3 and 4 may therefore be adjusted to any desired value.

Instead of using an electric compensator between 1 and 3 or 2 and 4 I may directly couple the circuits in each case and produce the desired phase changes by introducing suitable changes in the inductance, capacity and resistance of the circuits 3 and 4.

The circuit arrangements above described have been made extremely simple in order that the essential principle involved may not be obscured. It is obvious that the circuit arrangements might be modified in many ways without altering the method.

It will also be obvious that instead of heterodyning the two receiver circuits by a common E. M. F. and subsequently employing a compensator for binaurally centering the beat tones, the same result may be accomplished by heterodyning the two receiver circuits separately with individuals E. M. F.'s of the same frequency but of adjustable phase difference, and effecting a binaural centering of the beat tones in this manner by compensating for whatever phase difference may exist between the antenna currents.

It will also be understood that my method may be employed with a multiplicity of antennæ by providing proper compensating means.

Obviously my invention is not to be limited to any particular heterodyning, rectifying or compensating means, as any preferred form of each may be employed without affecting the principle involved.

My invention consists broadly of a method and means for determining phase difference; but as a particular application it will be apparent that my system may be employed for determining direction by the determination of phase difference.

Having fully described my invention what I claim as new is:

1. The method of determining phase difference between two alternating currents of the same frequency which consists of heterodyning each current with a third current of different frequency and adjusting the phase of one or both of the first two currents until the two trains of beats are in phase.

2. The method of determining phase difference between two vibrations of the same frequency which consist of producing beats between each of these vibrations and a third vibration of different frequency, and adjusting the phase of one or both of the first two vibrations until the two trains of beats are in phase.

3. The method of determining phase difference between two alternating currents which consists of heterodyning each current with a third current of different frequency and effecting binaural centering of the two beat trains to determine the phase difference.

4. The method of determining phase difference between two vibrations which consists of producing beats between each of these vibrations and a third vibration of different frequency and determining the phase difference between the two trains of beats by balancing.

5. The method of determining the direction of trains of waves which consists of receiving the waves on two spaced collectors, heterodyning each of the two currents produced with a third current and adjusting the phase of one or both of these received currents until the two trains of beats are in phase.

6. The method of determining phase difference which includes receiving wave trains on spaced collectors, heterodyning independently the wave trains received, and balancing to bring the resulting beat currents into phase.

7. The method of determining phase difference which includes receiving wave trains on two spaced collectors, heterodyning independently the received wave trains to produce beat tones, and binaurally centering the beat tones by balancing for the phase difference.

8. The method of determining phase difference which consists of receiving wave trains on two spaced collectors, heterodyning independently the two received wave trains with a single common source of oscillations and balancing to bring the currents into phase.

9. The method of determining phase difference which consists of receiving wave trains on two spaced collectors, heterodyning each received wave train with a local source of oscillations, rectifying the produced beat tones, and binaurally centering the beat tones by balancing for the phase difference.

10. The method of determining phase difference between radio frequency currents, which consists of receiving wave trains on two spaced antennæ, rectifying the wave trains, heterodyning the wave trains to produce beat tones, and binaurally centering the beat tones by balancing for the phase difference.

11. A system of determining phase difference which includes a plurality of spaced collectors, receiving circuits associated therewith, means for heterodyning the received currents, and balancing means for bringing the beat currents into phase.

12. A system of determining phase difference which includes two spaced collectors, receiving circuits associated therewith, heterodyning means common to the two circuits, and balancing means for bringing the currents into phase.

13. A system for determining phase difference which includes two spaced collectors, receiving circuits associated therewith, means for heterodyning the received currents, balancing means for bringing the currents into phase, and a telephone receiver connected with each of the receiving circuits, whereby the binaural sense may be employed for detecting a phase difference.

14. A system for determining phase difference which includes two spaced antennæ, receiving circuits associated therewith, means for heterodyning the received currents, means for rectifying the received currents, balancing means for bringing the currents into phase, and a telephone receiver connected with each of the receiving circuits whereby the binaural sense may be employed for detecting a phase difference.

ERNEST MERRITT.